(12) United States Patent
Hradetzky

(10) Patent No.: US 8,983,137 B2
(45) Date of Patent: Mar. 17, 2015

(54) PERSONALIZED ADVERTISING AT A POINT OF SALE UNIT

(71) Applicant: Stefan Hradetzky, Zurich (CH)

(72) Inventor: Stefan Hradetzky, Zurich (CH)

( * ) Notice: Subject to any disclaimer, the term of this patent is extended or adjusted under 35 U.S.C. 154(b) by 0 days.

(21) Appl. No.: 13/742,410

(22) Filed: Jan. 16, 2013

(65) Prior Publication Data

US 2014/0095318 A1    Apr. 3, 2014

Related U.S. Application Data

(63) Continuation-in-part of application No. 13/601,046, filed on Aug. 31, 2012, now abandoned.

(51) Int. Cl.
*G06K 9/00*    (2006.01)
*G06Q 30/02*    (2012.01)

(52) U.S. Cl.
CPC ........ *G06Q 30/0269* (2013.01); *G06Q 30/0251* (2013.01)
USPC ...................... 382/104; 705/14.58; 705/14.65

(58) Field of Classification Search
CPC .......... G06K 9/00221; G06K 9/00228; G06K 9/00624; G06K 2009/00221; G06K 2009/00322; G06K 2009/00624; G06K 2209/15; G06K 2209/13; G06T 2207/30196; G06T 2208/30201; G06T 2207/30252; G06Q 30/0251; G06Q 30/0261; G06Q 30/0269; G06Q 30/0271
USPC ......... 382/100, 103, 104, 105, 118; 705/14.4, 705/14.49, 14.5, 14.58, 14.65, 14.66, 14.67

See application file for complete search history.

(56) References Cited

U.S. PATENT DOCUMENTS

| 7,921,036 B1 * | 4/2011 | Sharma et al. | 705/14.66 |
| 8,010,402 B1 * | 8/2011 | Sharma et al. | 705/7.29 |
| 2002/0033794 A1 * | 3/2002 | Paulson | 345/156 |
| 2013/0054310 A1 * | 2/2013 | Sickenius | 705/7.39 |

OTHER PUBLICATIONS

Leung, B. "Component-based Car Detection in Street Scene Images." Massachusetts Institute of Technology, Department of Electrical Engineering and Computer Science, May 2004, pp. 1-71.
Badura, S. et al. "Advanced scale-space, invariant, low detailed feature recognition from images—car brand recognition." Proceedings of the International Multiconference on Computer Science and Information Technology, 2010, pp. 19-23.
Stebbins, A. "Exploring Methods for Car Recognition." TJHSST, Jun. 12, 2008, Alexandria, Virginia, pp. 1-4.
Security Design Services. "SDS ANPR System." World leading vehicle recognition, Jul. 24, 2007.

(Continued)

*Primary Examiner* — Andrew W Johns
(74) *Attorney, Agent, or Firm* — Coats & Bennett, PLLC

(57) ABSTRACT

Methods and apparatuses are provided to deliver advertisements personalized for customers proximate a point of sale unit, e.g., a fuel dispenser. A visual information capturing unit captures visual information of an object, e.g., an image, a shape, etc., disposed in a specified range of the point of sale unit, e.g., within 6 feet of the point of sale unit. A processor determines a visually perceptible characteristic of the object based on the visual information, selects an advertisement based on the determined characteristic, and outputs the selected advertisement from an advertisement unit proximate the point of sale unit.

36 Claims, 8 Drawing Sheets

(56) References Cited

OTHER PUBLICATIONS

Center for Democracy and Technology. "Seeing Is ID'ing: Facial Recognition & Privacy." Dec. 6, 2011, www.cdt.org, pp. 1-16.

Federal Trade Commission. "Facing Facts: Best Practices for Common Uses of Facial Recognition Technologies." Oct. 2012, available online <http://www.ftc.gov/os/2012/10/121022facialtechrptpdf>.

* cited by examiner

PERSONALIZED ADVERTISING AT A POINT OF SALE UNIT

This application is a continuation-in-part of prior application Ser. No. 13/601,046, filed 31 Aug. 2012, the disclosure of which is incorporated herein by reference in its entirety.

The disclosed system and method is related to improvements in fuel dispensers, especially those featuring video displays.

BACKGROUND

Advertisers are increasingly interested in improving the distribution of advertisements and/or marketing content to a target audience, i.e., persons or specific classes of persons, believed to have an above-average interest in a certain topic, product category, or brand. In addition, advertisers are increasingly interested in distributing advertisements and/or marketing content to a clearly defined geographic area, e.g., in local stores, to test and measure the impact of specific marketing initiatives. Such targeted or personalized advertising helps reduce the problem of waste coverage for advertisers. Reducing waste coverage is desirable because it helps reduce advertising costs by reducing ad coverage reaching people who are not potential buyers or users. With targeted advertising, advertisers may also want to measure how many people watch an advertisement and/or how long individuals watch an advertisement to gain more transparency on the relationship between the advertising effort and the success or failure of the advertising effort.

One way to improve targeted advertising involves collecting and using information regarding different groups of people, e.g., information about the interests of individuals. Such information may be gained through market research. The classification or grouping of individuals based on one or more characteristics of the individuals (e.g., purchasing power, interests, past purchase history, etc.) facilitates the ability to predict future purchasing actions by these individuals. Such classifications can be used to select personalized advertising for an individual.

There are many different means for presenting advertisements to customers. In recent years, fuel dispensers have evolved into technically advanced point of sale (POS) devices, which in some cases may be configured to deliver advertisements to consumers. Such advertisements are useful for marketing goods sold in the convenience store associated with the gas station, marketing technical services provided by the gas station, and/or delivering advertisements and marketing content of third party advertisers. Examples of pumps systems are described in U.S. Patent Publication 2005/0127796 A1 titled "Audio/Video Display Equipment for Gas Pumps," which is hereby incorporated in its entirety. Advertising at fuel dispensers offers a significant advantage compared to other digital out-of-home advertising, at least in part because of the higher probability of undivided attention for the displayed content during the "idle" time of the customer while the vehicle refuels.

Currently, point of sale terminals, such as fuel dispensers, provide general advertisements and/or advertisements specific to the products and/or services of the store associated with the point of sale terminal. To reduce waste coverage and/or advertising costs, it is desirable to provide targeted or personalized advertising at such point of sale terminals.

SUMMARY

Methods and apparatus disclosed herein deliver advertisements personalized for customers proximate a point of sale unit, e.g., a fuel dispenser. As used herein, "personalized advertising" refers to advertising personalized for a viewer based on information collected about the viewer. One exemplary method automatically captures visual information regarding an object disposed in a specified range of the point of sale unit, e.g., within 6 feet of the point of sale unit, responsive to entry of the customer in the specified range of the point of sale unit. The method further determines a visually perceptible characteristic of the object based on the visual information, selects an advertisement based on the determined characteristic, and outputs the selected advertisement from an advertisement unit proximate the point of sale unit.

An exemplary advertising unit associated with a point of sale unit comprises a visual information capturing unit and a processor operatively connected to the visual information capturing unit. The visual information capturing unit is configured to automatically capture visual information regarding an object disposed in a specified range of the point of sale unit responsive to entry of the customer within the specified range of the point of sale unit. The processor is configured to determine a characteristic of the object based on the visual information, and to select an advertisement based on the determined characteristic for output to an output unit.

An exemplary method captures at least one image of a vehicle disposed in a specified range of a fuel dispenser, and determines characteristic comprising at least one of a make, a model, and an accessory of the vehicle based on the captured image(s). The method further selects an advertisement based on the determined characteristic and outputs the selected advertisement from an advertisement unit proximate the fuel dispenser.

DETAILED DESCRIPTION

The present invention provides a method and apparatus for providing personalized advertising to a viewer using advertising equipment proximate a point of sale (POS) terminal, e.g., a fuel dispenser. While the following describes the invention in terms of a fuel dispenser POS terminal, it will be appreciated that the invention applies to any POS terminal capable of presenting advertisements to a customer.

Figure 1:
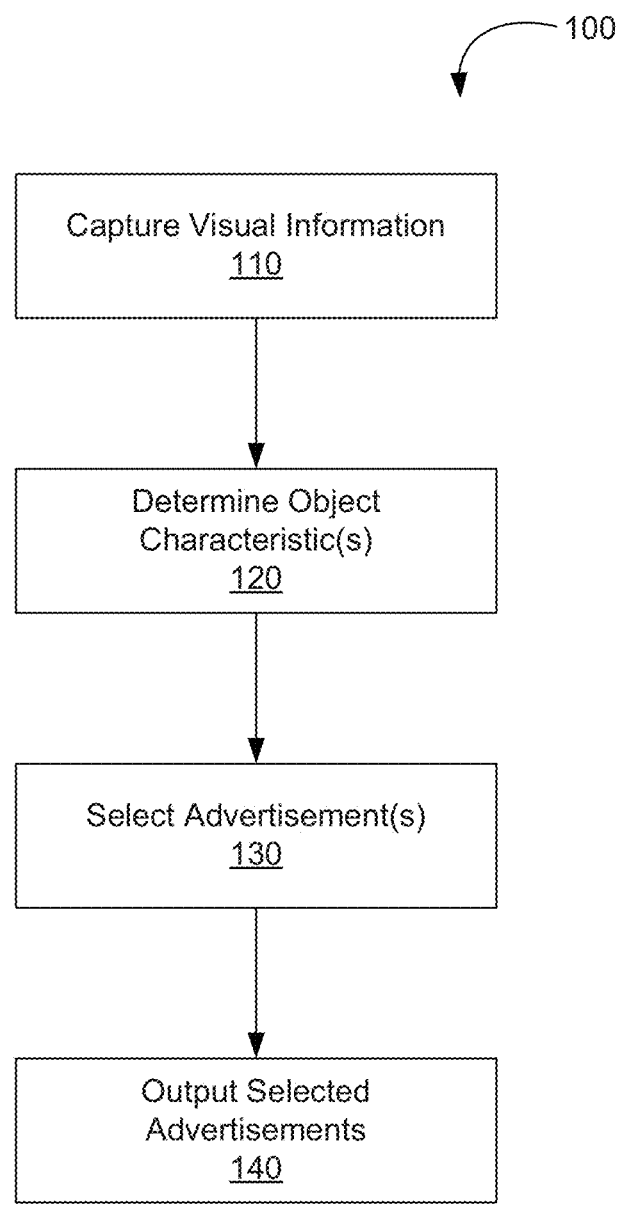
FIG. 1 shows a method of delivering advertisements personalized for those viewing the advertisements according to one exemplary embodiment.
Figure 2:
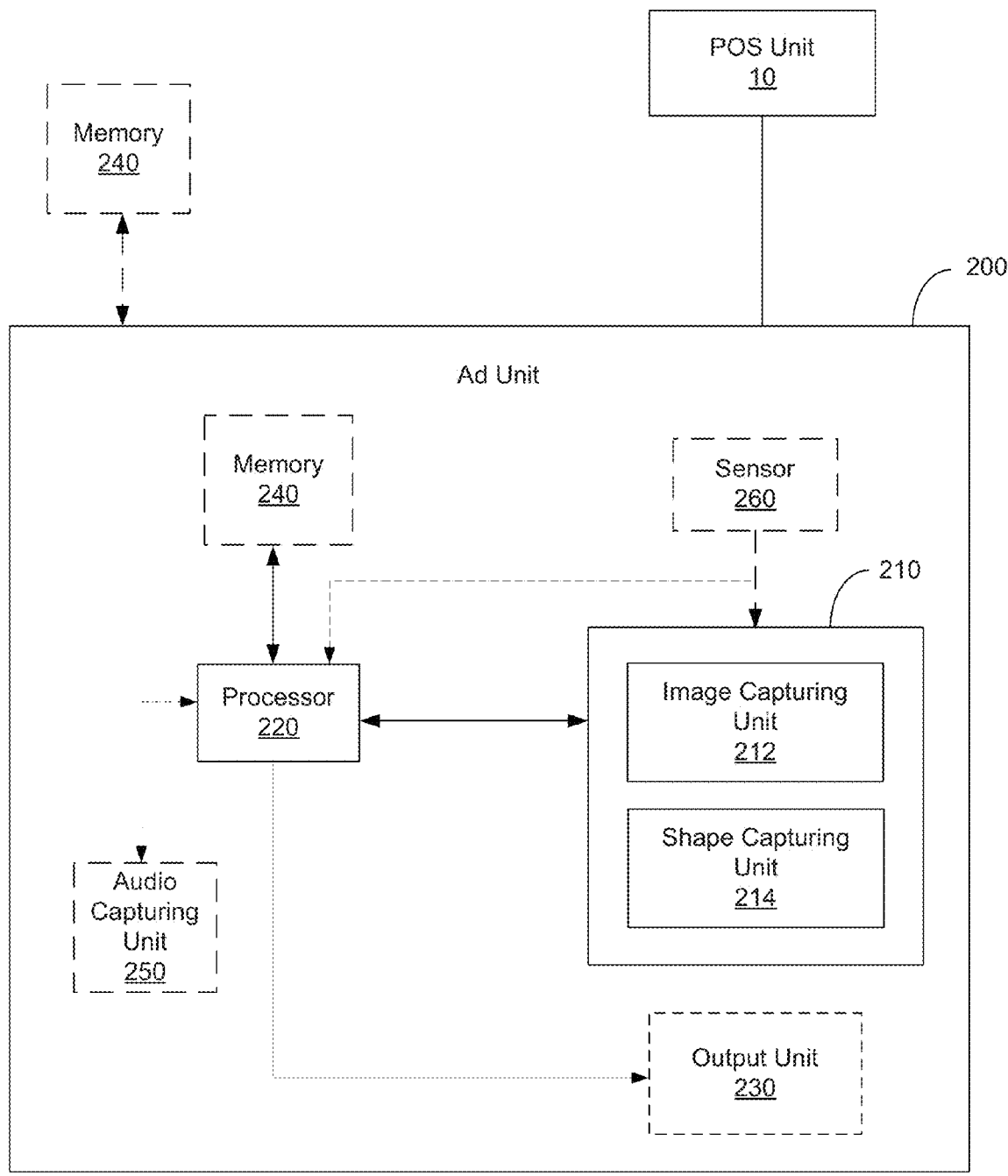
FIG. 2 shows a block diagram of an advertising unit according to one exemplary embodiment.
Figure 4:
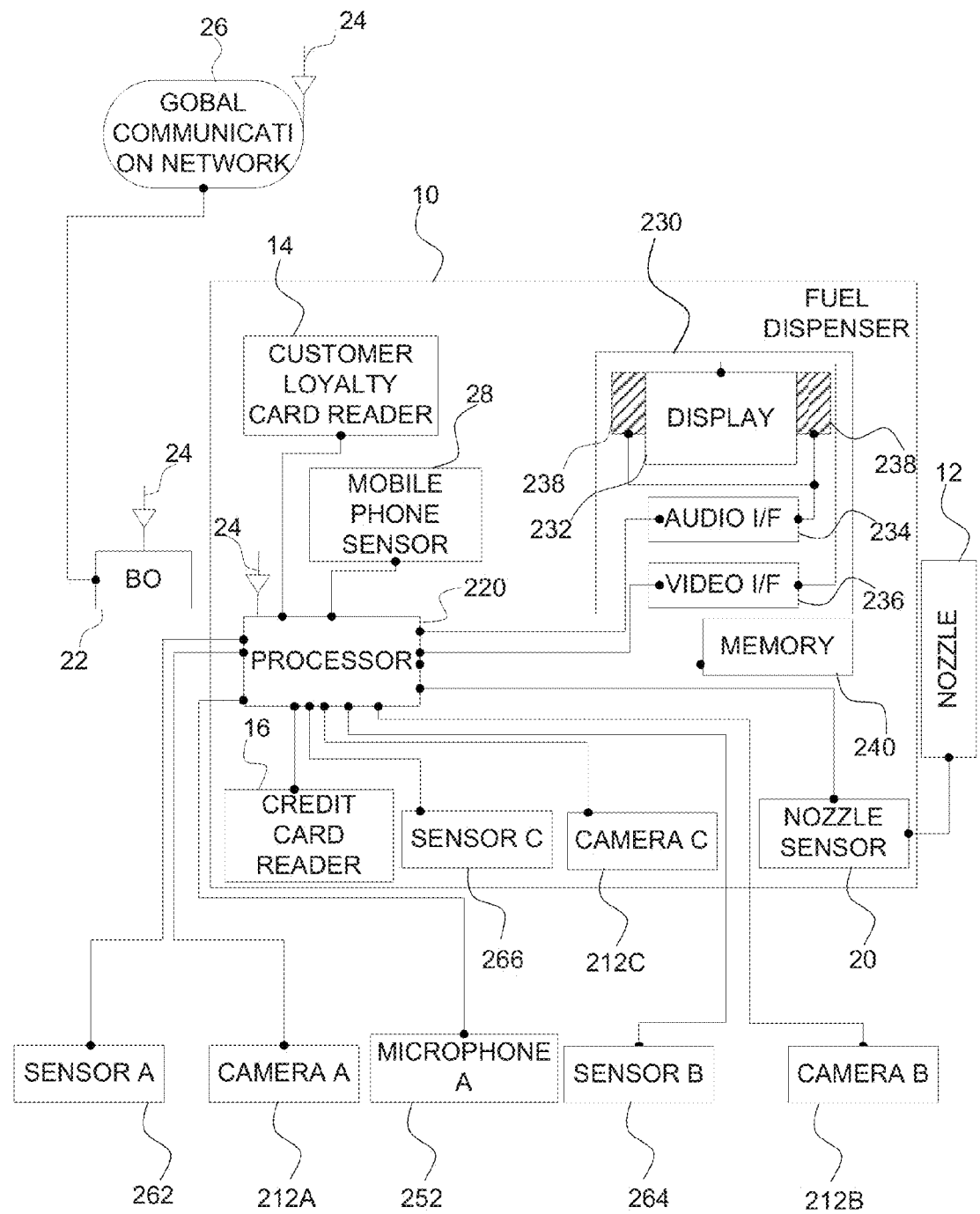
FIG. 4 shows a more detailed block diagram of a system for personalized advertising according to one exemplary embodiment.
Figure 7:
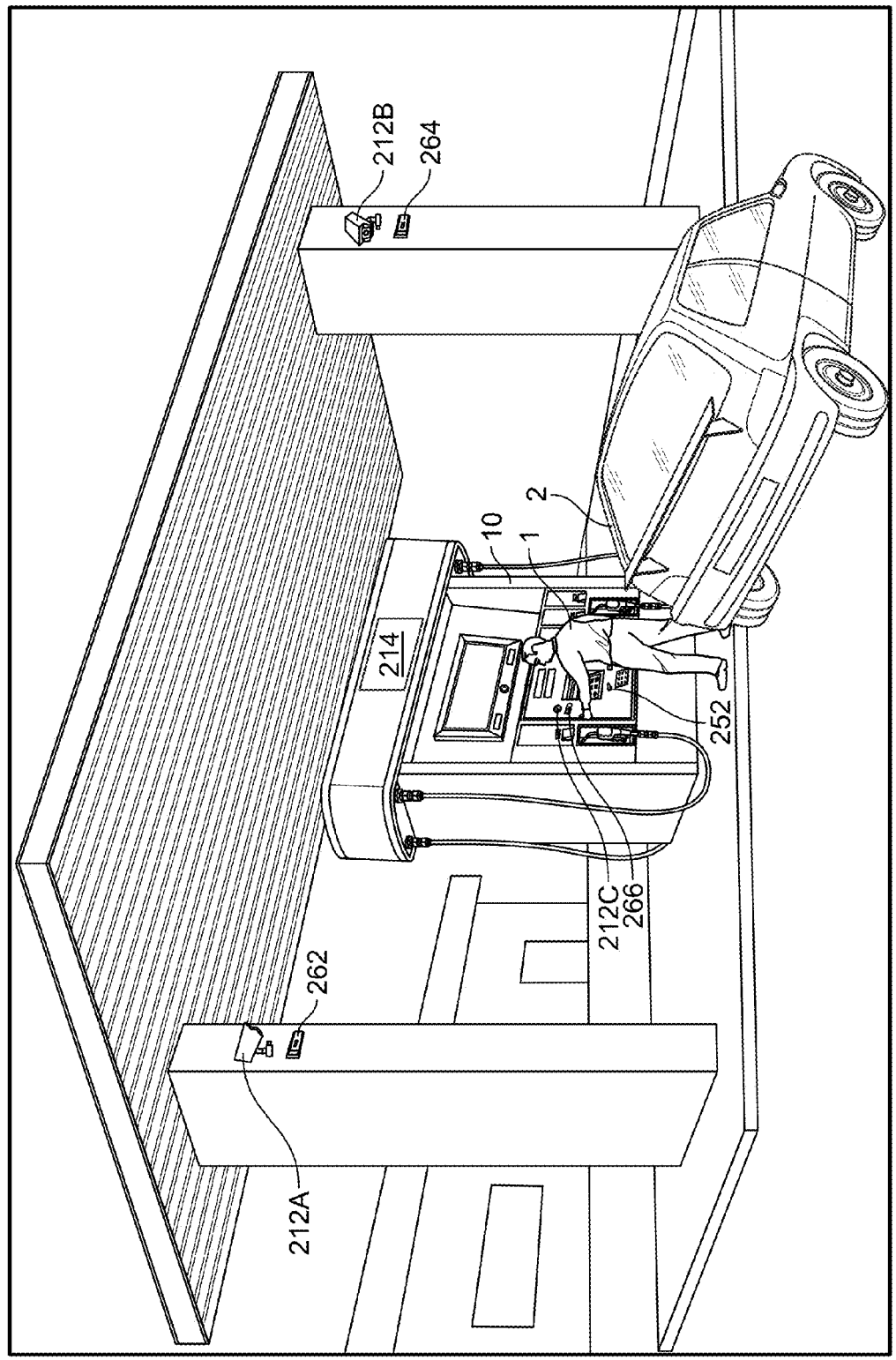
FIG. 7 shows an exemplary overview of a fuel dispenser installation at a gas station.

FIGS. 1 and 2 respectively show an exemplary method 100 and advertising unit 200 for displaying personalized advertisements to a customer 1 fuelling a vehicle 2 (FIG. 7) at a fuel dispenser 10 or other point of sale terminal 10. The elements of the advertising unit 200 may cooperate with existing elements of the fuel dispenser 10, such as a built-in processor 220, customer loyalty card reader 14, credit card reader 16, nozzle sensor 20, etc. (FIG. 4). The technical elements of the advertising unit 200 may be integrated in future models of fuel dispensers 10 or may be installed as a separate technical unit, e.g., as a so-called "fuel top/pump top device" (FIG. 7). The technical elements of the advertising unit 200 may also be combined in a way such that they are retrofitted in other ways onto existing fuel dispensers 10.

In one exemplary embodiment, the advertising unit 200 comprises a visual information capturing unit 210 and a processor 220. When an object approaches or is otherwise proximate the fuel dispenser 10, visual information capturing unit 210 captures visual information regarding an object proximate the fuel dispenser within a specified range, e.g., 6 feet (block 110). Processor 220 determines a visually perceptible characteristic of the object based on the visual information (block 120), selects an advertisement based on the determined characteristic (block 130), and outputs the selected advertisement to an output unit 230 (block 140).

Visual information capturing unit 210 may comprise an image capturing unit 212 and/or a shape capturing unit 214. The image capturing unit 212 may comprise any type of image capturing device, including but not limited to a still-frame camera, a video camera, etc. The shape capturing unit 214 may comprise any type of shape capturing device, including but not limited to a 3-D scanner, a laser scanner, etc. As used herein, the image capturing unit 212 and shape capturing unit 214 do not include barcode readers or other devices used to read a barcode. The visual information capturing unit 210 automatically captures visual information regarding the object proximate the fuel dispenser 10 associated with the customer 1 responsive to the customer's entry to the area proximate the fuel dispenser. Exemplary objects comprise the vehicle 2, the customer 1, etc.

The processor determines visually perceptible characteristic(s) of the object, e.g., of the vehicle 2 and/or customer 1, based on the captured visual information. For example, based on the visual information, the processor 220 may determine the make and/or model of the vehicle 2, a manufacturing year of the vehicle 2, and/or license plate characteristic(s). Processor 220 may also identify one or more vehicular accessories, e.g., paint stripes, a spoiler, or other decorative accessory, an equipment mount, sporting equipment mounted to or inside the vehicle 2, a child accessory (e.g., a car seat), and/or a handicap accessory (e.g., a wheelchair lift). Alternatively or additionally, when the object is or includes the customer 1, processor 220 may determine an estimated age of the customer, a gender of the customer, characteristics of clothing worn by the customer (e.g., name brand), jewelry worn by the customer, etc., based on the captured images.

The determined characteristics may be stored in a memory 240 disposed in the advertising unit 200 or external to the advertising unit 200. Memory 240 may comprise any known memory, including a Random Access Memory (RAM), Read Only Memory (ROM), and/or an erasable programmable read-only memory (EPROM or Flash memory). Based on the determined characteristic(s), processor 220 selects an advertisement. It will be appreciated that the advertisement may be selected based on one or more of the determined characteristics, and/or that the processor 220 may place a higher emphasis on one or more of the determined characteristics. Because the advertisement is selected based on the personal characteristics determined for the customer 1, the selected advertisement represents a personalized advertisement. The processor 220 may select the advertisement from a plurality of advertisements stored in memory 240 and/or in a remote database (not shown).

The processor outputs the selected advertisement to an output unit 230 comprising any known device capable of presenting an advertisement to a customer 1. For example, output unit 230 may comprise a speaker configured to output an audio advertisement. Alternatively, the output unit 230 may comprise an audio/video (A/V) output unit configured to output one or more advertisement images along with an audio advertisement. While not explicitly shown, some embodiments of output unit 230 may also or alternatively include a printer configured to print out advertisements, coupons, etc., for the customer based on the determined visually perceptible characteristic(s). While FIG. 2 shows the output unit 230 as being part of the advertising unit 200, it will be appreciated that the output unit 230 may, alternatively, be part of the fuel dispenser 10 separate from the advertising unit 200.

In addition to determining one or more characteristics of the object based on the visual information, the processor 220 may also retrieve one or more publically available customer characteristics from a remote database. For example, processor 220 may retrieve an identity of the customer, a profession of the customer, a purchasing power of the customer, an age or age range of the customer, one or more family characteristics associated with the customer (e.g., married/single, number of children, etc.), credit card information associated with the customer (e.g., number and type of credit cards, credit score and/or history, etc.), and/or social networking information associated with the customer 1. In some cases the processor 220 may also determine database-type characteristics regarding a wireless device owned by the customer 1 and/or the wireless provider used by the customer 1. In this embodiment, the processor 220 selects an advertisement based on the determined visually perceptible characteristics and the retrieved database-type customer characteristic(s).

In some embodiments, advertising unit 200 may also include an audio capturing unit 250 configured to detect an audible sound emitted by the customer 1, vehicle 2, or other proximate object. Based on the detected sound, the processor 220 may determine additional characteristics of the object. For example, audio capturing unit 250 may detect the engine sound of the vehicle 2, which may be used to further determine the vehicle's make, model, and/or upgrades. Processor 220 thus selects an advertisement based on the visual information and the detected sound. In some embodiments, processor 220 may select an advertisement based on the determined visually perceptible characteristics, the detected sound, and the retrieved database-type customer characteristics.

Figure 3:
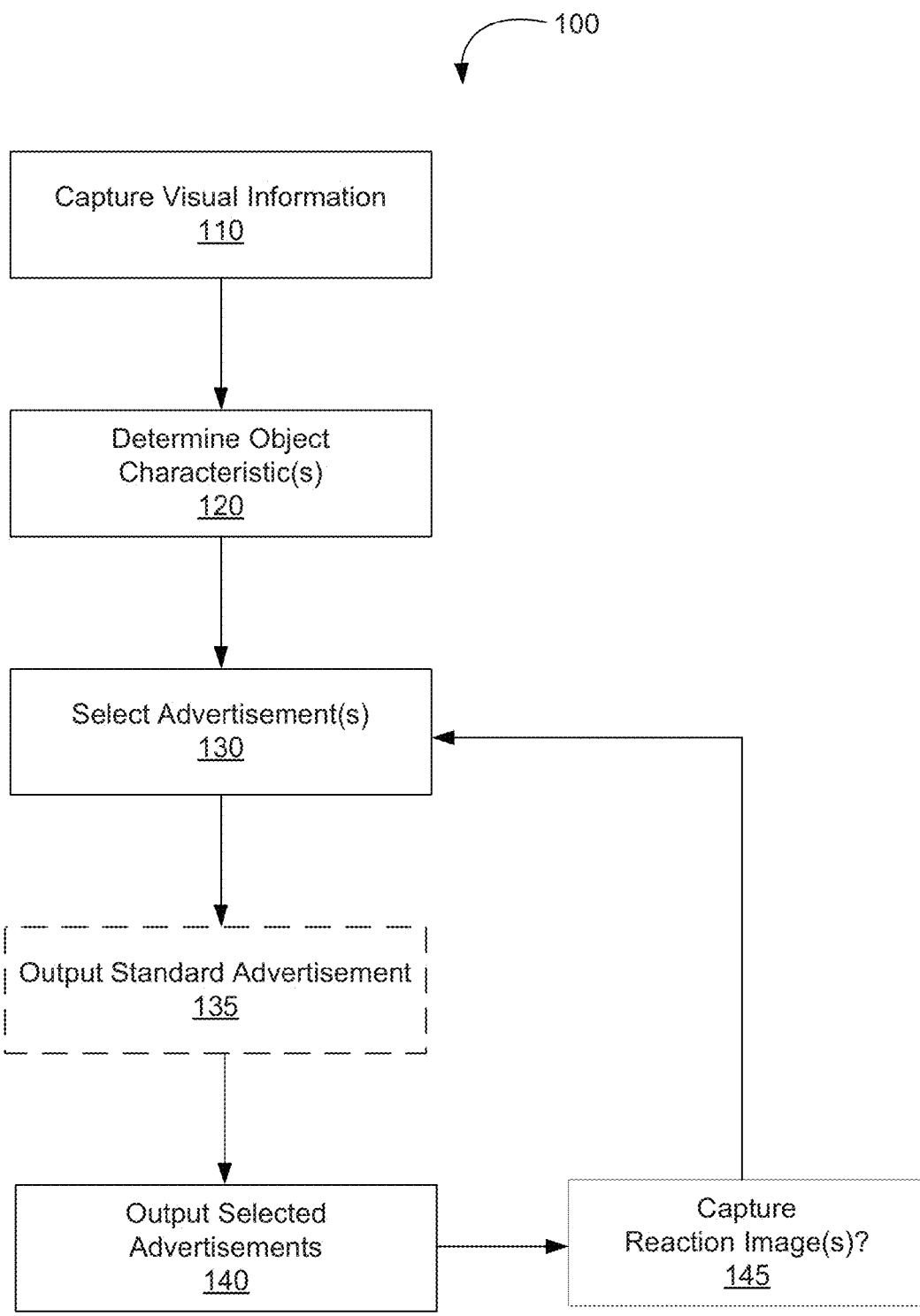
FIG. 3 shows a method of delivering advertisements personalized for those viewing the advertisements according to one exemplary embodiment.

FIG. 3 shows method 100 according to another exemplary embodiment. The method 100 of FIG. 3 includes capturing visual information regarding an object proximate the fuel dispenser 10 (block 110), determining audible and/or visually perceptible characteristic of the object (block 120), e.g., based on the captured visual information and/or detected sound, selecting an advertisement based on the determined audible and/or visually perceptible characteristics and/or retrieved customer characteristics (block 130), and outputting the selected advertisements (block 140). In some embodiments, processor 220 may output the selected advertisement responsive to a fuel dispense signal. In other embodiments, the processor 220 may output a standard advertisement (optional block 135) before outputting the selected advertisement, e.g., to capture the customer's attention while the processor 220 is selecting the advertisement.

Exemplary embodiments may also use the image capturing unit 212 to capture an image of the customer 1 during the output of the selected advertisement, where the captured image is a reaction image assumed to represent the customer's reaction to the selected advertisement (block 145). For example, the image capturing unit 212 may capture a facial expression of the customer 1 and/or a viewing time of the customer 1. Based on the reaction image(s), processor 220 may select additional advertisements (block 130).

Various different options may be used to start or otherwise activate the personalized advertising process described herein. In some embodiments, the advertising unit 200 includes an arrival sensor 260 that outputs an arrival or start signal upon sensing the arrival of the object within a specified range of the fuel dispenser 10. Responsive to the arrival signal, processor 220 activates the visual information capturing unit 210 so as to start the visual information capturing process. In other embodiments, the visual information capturing unit 210 captures visual information responsive to, e.g., a credit card signal.

Figure 5A:
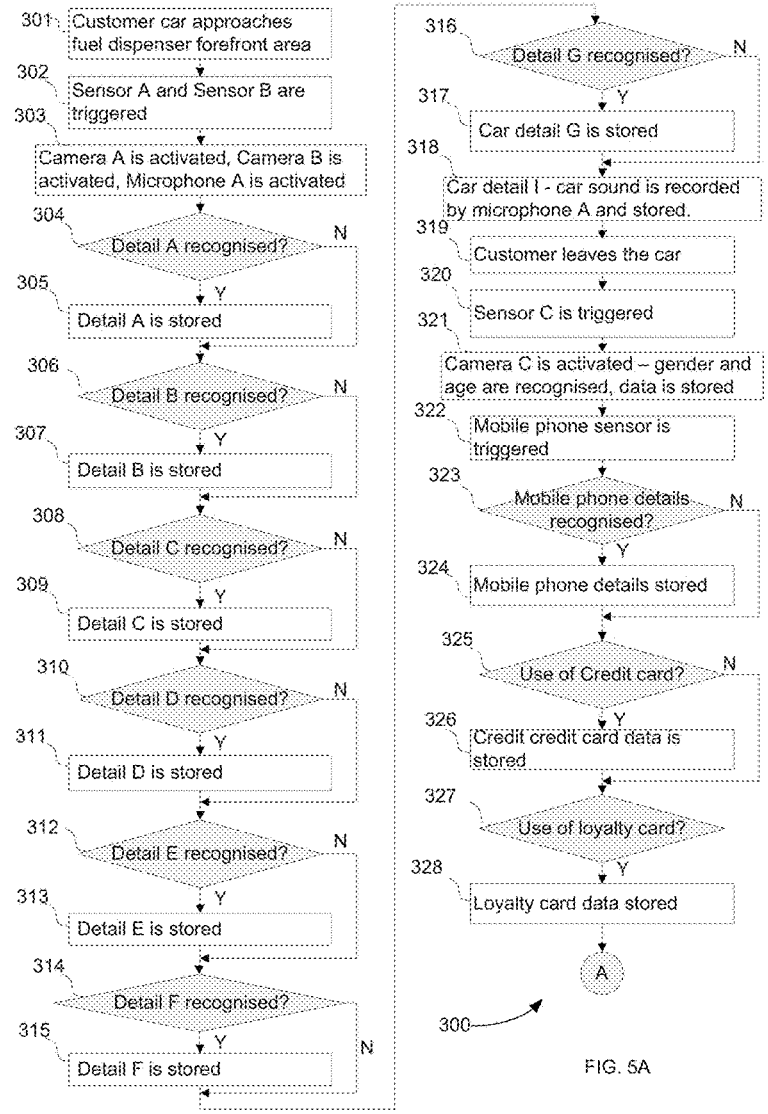
FIGS. 5A and 5B show details of an exemplary method of delivering personalized advertising according to the present invention.
Figure 5B:
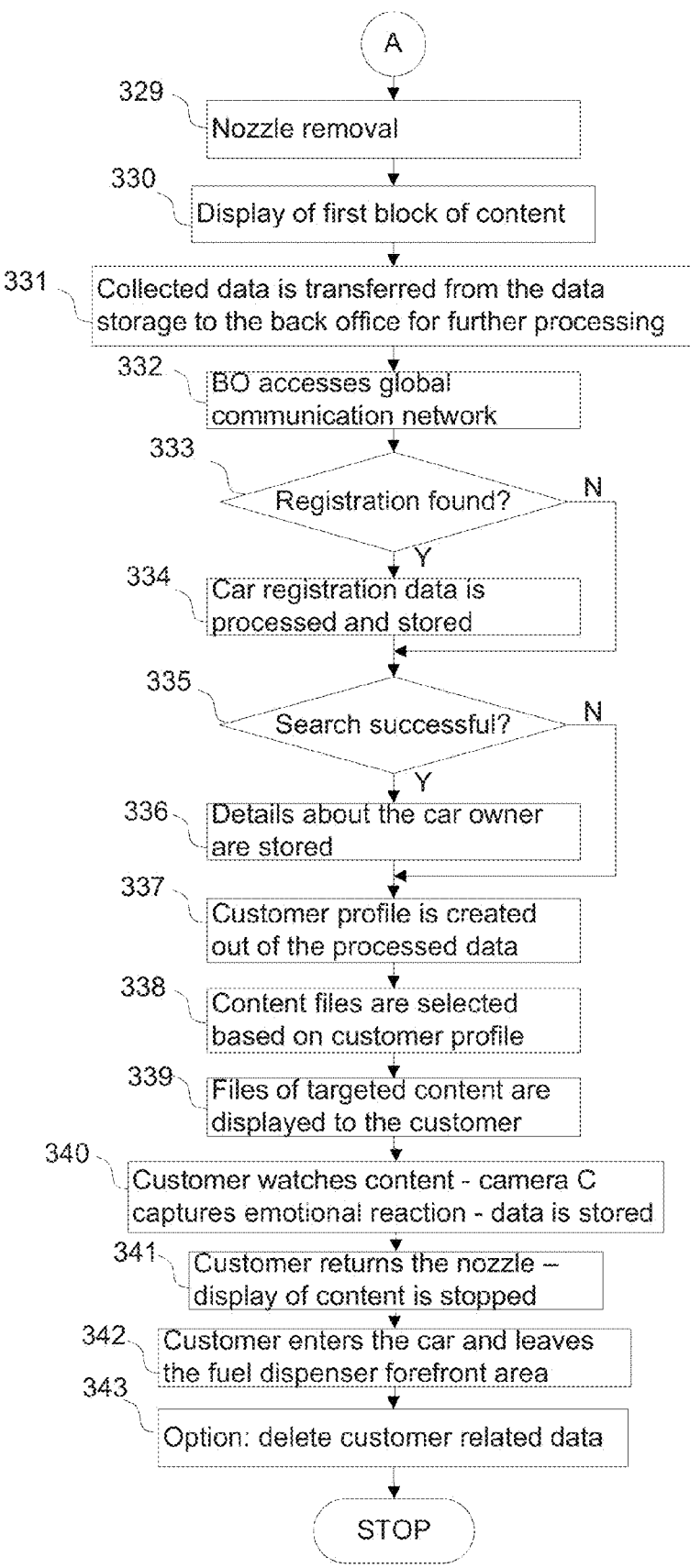
Figure 6:
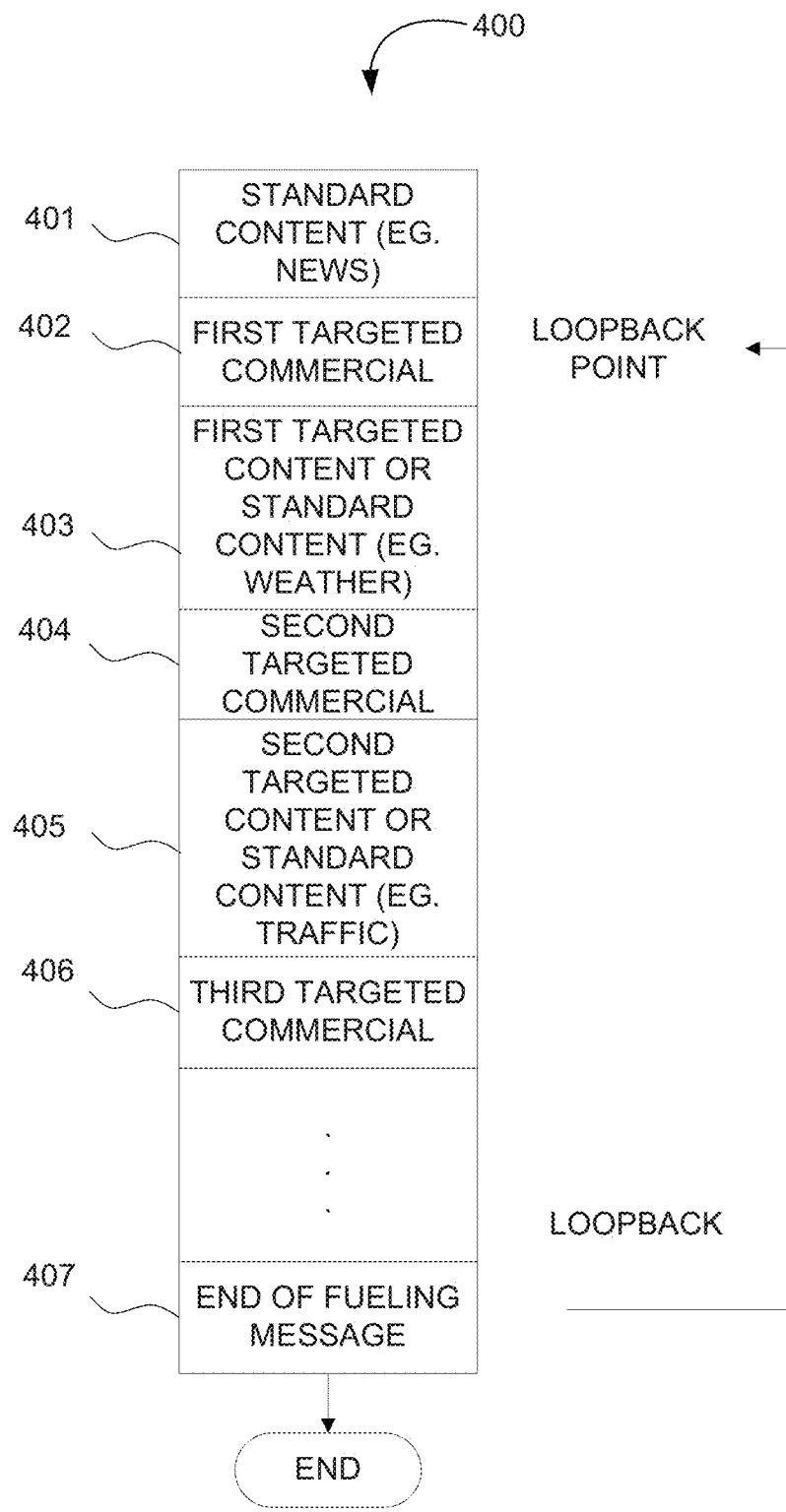
FIG. 6 shows an exemplary programming structure of the advertisements displayed during the fuelling process.

While the description associated with FIGS. 1-3 focused on general implementations, the following description with respect to FIGS. 4-6 provide details for some specific embodiments. It will be appreciated that the present invention is not limited to these specific embodiments.

FIG. 4 shows a detailed block diagram of an exemplary fuel dispenser 10 and advertising unit 200. In the embodiment of FIG. 4, processor 220, output unit 230, and memory 240, are disposed in the fuel dispenser 10. In this example, processor 220 provides monitor and control functions for all aspects of the fuel dispenser 10 and advertising unit 200. The output unit 230, as incorporated into the exemplary fuel dispenser 10, includes a display 232, an audio interface 234, a video interface 236, and/or loudspeakers 238. When the selected advertisement has audio and video components, processor 220 outputs the selected advertisement to the display 232 and loudspeakers 238 via the respective video interface 236 and audio interface 234. When the selected advertisement only has audio components, the processor 220 outputs the selected advertisement to the loudspeakers 238 via the audio interface 234. Memory 240 stores data relevant to the current fuel transaction, data downloaded from the back office 22, and in some embodiments, data related to the operations of the advertising unit 200. While not required, elements of the advertising unit 200 are placed within, on top, and/or near a fuel dispenser 10 in this embodiment.

The fuel dispenser 10 may be communicatively coupled to a back office (BO) 22, which contains several hardware and software computer systems to access, process, and store data, via a data cable (not shown), a wireless data transfer, or antenna(s) 24. The hardware and software in the BO 22 can provide access to a global communication network 26 (e.g., the world-wide web/internet), to access distant databases and sources of information (e.g., websites).

In the embodiment of FIG. 4, the visual information capturing unit 210 comprises the image capturing unit 212, which comprises camera A 212A, camera B 212B, and camera C 212C. The cameras may be high definition cameras and serve the purpose of collecting visual data to support the characterization of an object proximate the fuel dispenser 10, e.g., a customer 1 and/or customer vehicle 2, as described herein. Cameras 212A, 212B, 212C of the image capturing unit 212 collect different images, potentially from different angles, to enable the processor 220 to determine different characteristics, e.g., characteristics related to the vehicle 2, characteristics related to the customer 1, characteristics related to vehicle accessories (e.g., ski box, sports spoiler, etc., mounted on the vehicle 2 and/or kids seats or other accessories inside the vehicle 2), etc. The exemplary advertising unit 200 also includes the audio capturing unit 250 in the form of a microphone 252 to record audible sounds proximate the fuel dispenser 10. For example, microphone 252 may capture the engine sound pattern of the customer's vehicle 2 to enable the processor 220 to e.g., estimate the engine size and/or power, and as a result, the price level of the vehicle 2 and an estimated purchasing power of the customer 1.

The fuel dispenser 10 and/or advertising unit 200 may include a variety of sensors that facilitate the operation of the fuel dispenser 10 and advertising unit 200. For example, the embodiment of FIG. 4 includes an arrival sensor 260 in the form of sensor A 262, sensor B 264, and sensor C 266, which trigger corresponding cameras 212A, 212B, 212C and/or microphone 252. Sensors 262, 264, 266 may comprise proximity sensors, motion sensors, or other types of sensors. The arrival sensors 260 may be placed on or near the fuel dispenser 10 so as to best detect the arrival of a vehicle 2. In one embodiment, for example, sensor C 266 and camera C 212C may be placed on the front of the fuel dispenser 10 or integrated into the housing of the display 232 of the output unit 230. While FIG. 4 shows each camera 212A, 212B, 212C having a corresponding sensor, it will be appreciated that such is not required. The fuel dispenser 10 may further contain a nozzle sensor 20 associated with a nozzle 12 connected to the fuel dispenser 10 through a hose (not shown). Nozzle sensor 20 generates a fuel signal when the nozzle 12 is removed or returned. The fuel dispenser 10 and/or advertising unit 200 may also contain a mobile phone sensor 28, which aims to sense the presence of a customer's mobile phone to enable the collection of data related to the mobile phone, e.g., the carrier, brand, type, etc., of the mobile phone, used by the processor 220 to generate a more detailed customer profile, and thus to select a more personalized advertisement. Sensor 28 may rely on any known or future wireless technology standard (e.g., Bluetooth®).

The fuel dispenser 10 may further contain a customer loyalty card reader 14 (standard, contactless, manual entry of customer number or a swipe reader is possible) and/or a credit card reader 16 (standard, contactless or a swipe reader is possible). The credit card profile data may contribute to the customer profile, as disclosed herein. Examples of the use of credit card profile data in targeted advertising are described in U.S. Patent Publication 2011/0226854 A1, titled "Systems and Methods for Targeted Point-of-Sale Advertisements," which is hereby incorporated in its entirety.

FIGS. 5A and 5B show a detailed method 300 of an exemplary process of collecting customer data, delivering personalized advertising, and collecting customer feedback to the displayed advertising at a fuel dispenser 10 while fuelling the vehicle 2. The process 300 begins when vehicle 2 enters a predetermined area proximate the fuel dispenser 10 (block 301). Upon entering the predetermined area, the vehicle 2 triggers sensor A 262 and sensor B 264 (block 302), which sends a signal to the processor 220. Next, video camera A 212A and video camera B 212B and microphone A 252 are activated responsive to the triggering of sensor A 262 and sensor B 264 (block 303). Both video cameras 212A, 212B capture visual information about the vehicle 2, e.g., images of the front and back of the vehicle 2. Both cameras 212A, 212B are installed at a distance from the fuel dispenser 10 and at an angle relative to the vehicle 2 to make sure the best images are achieved.

In blocks 304-317, processor 220 evaluates the captured images to determine visually perceptible characteristics regarding the vehicle 2. If the processor 220 is unable to successfully recognize a particular characteristic, the process continues on to the next decision block regarding a different visually perceptible characteristic. Specifically, if a first visually perceptible characteristic of the vehicle 2, e.g., the vehicle brand, is successfully recognized from the captured images (block 304) processor 220 stores the first characteristic in memory 240 (block 305). After storing the first visually perceptible characteristic (or after determining the first visually perceptible characteristic is not recognized), the processor 220 examines the images to determine a second visually perceptible characteristic, e.g., the vehicle model. If the second visually perceptible characteristic is recognized (block 306), the processor 220 stores the second visually perceptible characteristic in memory 240 (block 307). After storing the second visually perceptible characteristic (or after determining the second visually perceptible characteristic is not recognized), the processor 220 examines the images to determine a third visually perceptible characteristic, e.g., the vehicle type. If the third visually perceptible characteristic is recognized (block 308), processor 220 stores the third visually perceptible characteristic in memory 240 (block 309). After storing the third visually perceptible characteristic (or after determining the third visually perceptible characteristic is not recognized), the processor 220 examines the images to determine a fourth visually perceptible characteristic, e.g., the presence and/or type of external vehicle accessories (skis, ski box, bicycle holder, surfboard, surfboard holder, trailer, etc.). If the fourth visually perceptible characteristic is recognized (block 310), processor 220 stores the fourth visually perceptible characteristic in memory 240 (block 311). After storing the fourth visually perceptible characteristic (or after determining the fourth visually perceptible characteristic is not recognized), processor 220 examines the images to determine a fifth visually perceptible characteristic, e.g., the presence and/or type of kids car seats. If the fifth visually perceptible characteristic is recognized (block 312), processor 220 stores the fifth visually perceptible characteristic in memory 240 (block 313). After storing the fifth visually perceptible characteristic (or after determining the fifth visually perceptible characteristic is not recognized), the processor 220 examines the images to determine a sixth visually perceptible characteristic, e.g., the presence and/or type of vehicle decorative elements (spoiler, special rims, pinstripes, etc.). If the sixth visually perceptible characteristic is recognized (block 314), processor 220 stores the sixth visually perceptible characteristic in memory 240 (block 315). After storing the sixth visually perceptible characteristic (or after determining the sixth visually perceptible characteristic is not recognized), the processor 220 examines the images to determine a seventh visually perceptible characteristic, e.g., a license plate number. If the seventh visually perceptible characteristic is recognized (block 316), processor 220 stores the seventh visually perceptible characteristic in memory 240 (block 317).

After storing the seventh visually perceptible characteristic (or after determining the seventh visually perceptible characteristic is not recognized), the processor 220 evaluates and/or stores vehicle sounds captured by microphone A 252 (block 318). Such sounds may be used to determine further characteristics regarding the vehicle 2, e.g., engine upgrades, muffler upgrades, etc.

In blocks 319-328, processor 220 evaluates various visually perceptible and/or audible characteristics regarding the customer 1 and/or the property belonging to the customer 1. When the customer 1 exits the vehicle 2 (block 319), sensor C 266 is triggered (block 320) and camera C 212C is activated (block 321). Because the customer 1 is typically facing the fuel dispenser 10 at this point, camera C 212C is able to capture images of the upper body and face of the customer 1. Based on the captured information, processor 220 determines and stores characteristics of the customer 1, e.g., age range, gender, etc. (block 321). Automatic recognition of the physical attributes is very technically advanced nowadays and can be regarded as a standard product with high recognition rates, which can be integrated without any technical development.

Mobile phone sensor 28 may also be triggered at this point (block 322). If the processor recognizes characteristics of a customer's mobile phone (block 323), e.g., mobile phone carrier, brand, type, etc., processor stores the mobile phone characteristics in memory 240 (block 324). After storing the mobile phone characteristics (or after determining mobile phone characteristics are not recognized), processor 220 determines whether the customer 1 uses the credit card reader 16 (block 325). In jurisdictions in which the use of existing customer profiles of other sources, or existing customer data (e.g., credit card data) is not restricted by a data privacy act or other legal regulations, the existing data can be used as an additional source, and to contribute to the generation of the customer profile. Thus, if customer 1 uses a credit card, details regarding the customer's credit card are stored in memory 240 (block 326). After storing the credit card details (or after determining a credit card is not used), processor 220 determines if the customer 1 uses a customer loyalty card identified by the card reader 14 or by numbers entered by the customer 1 via a keypad (block 327). If the customer 1 uses a loyalty card, the loyalty card data is stored in memory 240 (block 328). Else, the process proceeds to the next block.

When the customer 1 removes the nozzle 12 (block 329), processor 220 outputs a first block of advertisement content to display 232 (block 330). This first block of advertisement content may comprise standard content not personalized to the customer 1. The running time of the first block of advertisement content may be used to compile and process the collected data in the BO 22, create the customer profile, select the personalized advertisements, and/or transfer the selected advertisements from an external location to the processor 220.

In this embodiment, the collected data is retrieved from memory 240 and transferred to the BO 22 for further processing (block 331). The BO 22 accesses the global communication network 26 to access one or more remote databases (block 332). The BO 22 may use the remote databases to determine whether the vehicle registration database could be accessed via the license plate number and personal data (vehicle brand, vehicle type, vehicle model, name of the vehicle owner, year of manufacture of vehicle 2, registration address of the vehicle 2, distance customer 1 lives from the gas station, etc.) could be retrieved (block 333). Any of the retrieved information is stored (block 334). The BO 22 may also use the remote databases to determine whether the name of the vehicle owner, the name of the credit card owner, and the name of the customer loyalty card owner match (block 335). If so, a search in the global communication network 26 is carried out to collect and store more information about the customer 1 (block 336). In some cases, it may be possible to access social networks with the name to learn more about the educational level, the name of the employer, the professional rank, the location of the employer, the location of the customer, interests of the customer, etc.

The collected data is then processed to generate a customer profile (block 337). The creation of the consumer profile can be done in real-time or near real-time, e.g., in the time between the customer 1 removing the nozzle 12 and the output of the first personalized commercial. The customer profile may include any or all of a customer's age, gender, purchasing power, family situation, interest in sport/outdoor activities/water sports, interest in car racing/sports cars, mobile phone carrier, mobile phone brand, mobile phone model, name of vehicle owner, year of manufacture of vehicle 2, market price of vehicle 2, registration address of the vehicle 2, etc. Based on the customer profile, the processor 220 and/or the BO 22 selects one or more personalized advertisements for the customer 1 (block 338). The processor then outputs the selected advertisements to the elements of the output unit 230 in the fuel dispenser 10 for output to the customer 1 (block 339).

While the display 232 and/or loudspeakers 238 output the selected advertisements, camera C 212C may capture body movements and/or facial expressions, e.g., shaking head, smile, diverted gaze, etc., indicative of an emotional reaction and/or engagement of the customer 1 (block 340). Further, if the customer 1 looks towards the display 232, camera C 212C can capture images used to monitor the customer's viewing time and reaction (block 340). These details provide valuable market research information to advertisers, which may be delivered to the advertisers. Further, these details may be used to select additional personalized advertisements.

After finishing the fuelling process, the customer 1 returns the nozzle 12 to the fuel dispenser 10, which triggers the nozzle sensor 20, and processor 220 stops the display of the selected advertisements (block 341). Subsequently, the customer 1 enters the vehicle 2 and leaves the area (block 342). In some embodiments, all customer-related data is deleted (block 343), e.g., when the data privacy laws of the jurisdiction in which the gas station is located require the data be deleted.

FIG. 6 shows an exemplary programming structure 400 of the content and commercials displayed during the fuelling process. It will be appreciated that the illustrated programming structure is illustrative and not limiting. The structure is generated by merging update information (content pieces) with advertising, both according to the customer profile, so that it results in a set of personalized content and advertising. The programming structure 400 matches the approximate duration of an average fuelling process. If the fuelling process takes longer, so that the programming structure 400 is completed, it then loops back to an initial starting point and replays the information over. In case the fuelling process ends before the estimated average time, the display of the personalized advertisement stops as soon as the nozzle 12 is returned in to the fuel dispenser 10.

The programming structure starts at block 401 with a standard content piece (e.g., news). This content piece is identical for all customers, and therefore does not represent personalized advertising. The running time of the standard content 401 is used to compile and process all collected data related to the customer, access remote databases to enhance this data with further details, create the customer profile, and select the suitable set of content and advertising. Note that the advertising can be layered in any fashion with content pieces in order to gain and maintain the attention of the gas station customer 1 during the fuelling process. The personalized advertising is not limited to products and services offered by the convenience store of the gas station, but can be any desired advertisements.

At block 402, the personalized content and advertising are displayed. The first personalized commercial is shown at this position of the programming structure 400. In order to attract the attention of the gas station customer 1 to a product promotion or other kind of service, it is important to provide advertising which closely aligns with the highest activity of interest. Therefore the visual information about the vehicle 2 may be the indicator with the highest priority. For example, if a bicycle carrier mounted in the back or on the roof of the vehicle 2 indicates an interest in sports or outdoor activities, the personalized advertising may focus on outdoor products in nearby stores, on promotions for vacations with an outdoor or sports theme, on magazines or drinks in the gas station convenience store that are associated with outdoor activities, etc.

In block 403, the first personalized content piece (according to the detected interests of the customer 1) or a standard content (e.g., weather) is displayed. Subsequently, in block 404 the second personalized advertisement is shown. In block 405, the second personalized content piece (according to the detected interests of the customer 1) or a standard content (e.g., traffic) is displayed. Subsequently, in block 406 the third personalized commercial is shown. Afterwards an altering pattern of content and advertising is displayed for the remaining duration of the programming structure. Once the nozzle sensor 20 detects the return of the nozzle 12 to the fuel dispenser 10, an "end-of-fuelling" message is displayed (block 407). This message is displayed while the customer 1 walks back to the side of his/her vehicle 2 and opens the door.

FIG. 7 represents an exemplary overview of one possible fuel dispenser installation of the invention at a gas station and showing the possible position of cameras, sensors, and other hardware equipment. In the example of FIG. 7, sensor A 262 and camera A 212A, as well as sensor B 264 and camera B 212B, are mounted in specific positions in the wider area of the fuel dispenser 10 so as to allow the monitoring of a fuel dispenser forefront area, independently of the direction used by the vehicle 2 to approach the fuelling area. The camera and sensor elements are placed to capture visual data of the front and the back of a vehicle 2, of the inside of the vehicle 2 (e.g., child seats etc.), and of possible elements on the roof or other parts of the vehicle 2 (e.g., ski box, ski, surf boards, sports spoiler, etc.).

The fuel dispenser 10 contains a microphone A 252 which captures information about the sound emitted by the vehicle 2. It also contains a sensor C 266, which serves as a trigger for camera C 212C, to capture visual data of the customer 1 in the moment he/she removes the nozzle 12 from the dispenser 10, selects the fuel type, or enters the credit card into the credit card reader 16. Fuel dispenser 10 may also include the shape capturing unit 214 to capture shape information of the vehicle 2. It will be appreciated that the shape capturing unit 214 may be secured to the fuel dispenser 10, may be part of the fuel dispenser 10, or may be disposed proximate the fuel dispenser 10. It will also be appreciated that the shape capturing unit 214 may be implemented as part of one or more of the image capturing units 212.

The invention disclosed herein allows the generation of a detailed customer profile. In combination with the geographical location (the advertiser can select the area or even a single gas station) of the gas station, the system delivers a data set that can be of value for marketing, market research, and advertising. It will be appreciated that the present invention may be used with any point of sale device, and therefore, is not limited to fuel dispensers.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of delivering advertisements personalized to a customer proximate a point of sale unit, the method comprising:
   automatically capturing visual information regarding an object disposed in a specified range of the point of sale unit responsive to entry of the customer in the specified range of the point of sale unit;
   determining a characteristic of the object based on the visual information;
   selecting an advertisement based on the determined characteristic; and
   outputting the selected advertisement from an advertisement unit proximate the point of sale unit responsive to a fuel dispense signal.

2. The method of claim 1 further comprising detecting an audible sound emitted by the object, wherein determining the characteristic comprises determining the characteristic based on the visual information and the detected audible sound.

3. The method of claim 2 wherein the audible sound comprise at least one of a vehicular sound and a customer sound.

4. The method of claim 1 wherein the object comprises a vehicle proximate the advertising unit, and wherein the characteristic comprise a vehicle characteristic.

5. The method of claim 4 wherein the vehicle characteristic comprises at least one of:
   a vehicle make;
   a vehicle model;
   a manufacturing year;
   a license plate characteristic; and
   a vehicle accessory.

6. The method of claim 5 wherein the vehicle accessory comprises at least one of:
   a decorative accessory;
   a sporting equipment mount;
   an externally mounted sporting equipment;
   a child accessory; and
   a handicap accessory.

7. The method of claim 1 wherein the object comprises the customer, and wherein the characteristic comprises a customer characteristic.

8. The method of claim 7 wherein the customer characteristic comprises at least one of:
   an age of the customer;
   a gender of the customer;
   clothing worn by the customer; and
   jewelry worn by the customer.

9. The method of claim 1 further comprising retrieving a customer characteristic from a remote database, wherein determining the characteristic comprises determining the characteristic based on the visual information and the retrieved customer characteristic.

10. The method of claim 9 wherein the retrieved customer characteristic comprises at least one of:
    a profession of the customer;
    a purchasing power of the customer;
    an age range of the customer;
    one or more family characteristics associated with the customer;
    credit card information associated with the customer; and
    social networking information associated with the customer.

11. The method of claim 9 wherein the retrieved customer characteristic comprises a characteristic of a wireless device owned by the customer.

12. The method of claim 1 further comprising:
    capturing a reaction image associated with a customer reaction to the selected advertisement; and
    selecting an additional advertisement based on the captured reaction image.

13. The method of claim 12 wherein the reaction image comprises at least one of a facial expression of the customer and a viewing time of the customer.

14. The method of claim 1 further comprising generating a start signal responsive to detecting the arrival of the object in the specified range of the point of sale unit, wherein capturing the visual information comprises capturing the visual information responsive to the start signal.

15. The method of claim 1 further comprising outputting a standard advertisement before outputting the selected advertisement.

16. The method of claim 1 wherein automatically capturing the visual information comprises automatically capturing at least one image of the object disposed in the specified range of the point of sale unit responsive to entry of the customer in the specified range of the point of sale unit, the at least one image having two or fewer dimensions.

17. The method of claim 1 wherein automatically capturing the visual information comprises automatically capturing a shape of the object disposed within the specified range of the point of sale unit responsive to the entry of the customer in the specified range of the point of sale unit.

18. An advertising device associated with a point of sale unit and configured to deliver advertisements personalized to a customer proximate the point of sale unit, the advertising unit comprising:
    a visual information capturing circuit configured to automatically capture visual information regarding an object disposed in a specified range of the point of sale unit responsive to entry of the customer in the specified range of the point of sale unit; and
    a processor operatively connected to the visual information capturing circuit and configured to:
       determine a characteristic of the object based on the visual information; and
       select an advertisement based on the determined characteristic for output to an output circuit responsive to a fuel dispense signal.

19. The advertising device of claim 18 further comprising an audio capture circuit operatively connected to the processor and configured to detect an audible sound emitted by the object, wherein the processor is further configured to determine the characteristic based on the visual information and the detected audible sound.

20. The advertising device of claim 19 wherein the audible sound comprises at least one of a vehicular sound and a customer sound.

21. The advertising device of claim 18 wherein the object comprises a vehicle proximate the advertising device, and wherein the characteristic comprises a vehicle characteristic.

22. The advertising device of claim 21 wherein the vehicle characteristic comprises at least one of:
    a vehicle make;
    a vehicle model;
    a manufacturing year;
    a license plate characteristics; and
    a vehicle accessory.

23. The advertising device of claim 22 wherein the vehicle accessory comprises at least one of:
    a decorative accessory;
    a sporting equipment mount;
    an externally mounted sporting equipment;

a child accessory; and a handicap accessory.

24. The advertising device of claim 18 wherein the object comprises the customer, and wherein the characteristic comprises a customer characteristic.

25. The advertising device of claim 24 wherein the customer characteristic comprises at least one of:

an age of the customer;

a gender of the customer;

clothing worn by the customer; and jewelry worn by the customer.

26. The advertising device of claim 18 wherein the processor is further configured to:

retrieve a customer characteristic from a remote database; and determine the characteristic based on the visual information and the retrieved customer characteristic.

27. The advertising device of claim 26 wherein the retrieved customer characteristic comprises at least one of:

a profession of the customer;

information regarding a purchasing power of the customer;

an age range of the customer;

one or more family characteristics associated with the customer;

credit card information associated with the customer; and social networking information associated with the customer.

28. The advertising device of claim 26 wherein the retrieved customer characteristic comprises a characteristic of a wireless device owned by the customer.

29. The advertising device of claim 18 wherein:

the visual information capturing unit is further configured to capture a reaction image associated with a customer reaction to the selected advertisement; and the processor is further configured to select an additional advertisement based on the captured reaction image.

30. The advertising device of claim 29 wherein the reaction image comprises at least one of a facial expression of the customer and a viewing time of the customer.

31. The advertising device of claim 18 further comprising a sensor operatively connected to the visual information capturing circuit and configured to generate a start signal responsive to detecting the arrival of the object in the specified range of the point of sale unit, wherein the visual information capturing circuit is configured to capture the visual information responsive to the start signal.

32. The advertising device of claim 18 wherein the point of sale unit comprises a fuel dispenser.

33. The advertising device of claim 18 wherein the processor is further configured to output a standard advertisement to the output unit before outputting the selected advertisement to the output circuit.

34. The advertising device of claim 18 wherein the visual information capturing circuit comprises an image capturing circuit configured to automatically capture at least one image of the object disposed in the specified range of the point of sale unit responsive to entry of the customer in the specified range of the point of sale unit, the at least one image having two or fewer dimensions.

35. The advertising device of claim 18 wherein the visual information capturing circuit comprises a shape capturing circuit configured to automatically capture a shape of the object disposed within the specified range of the point of sale unit responsive to the entry of the customer in the specified range of the point of sale unit.

36. A method of delivering advertisements personalized to a customer proximate a fuel dispenser, the method comprising:

capturing at least one image of a vehicle disposed in a specified range of the fuel dispenser, the at least one image having two or fewer dimensions;

determining a characteristic of the vehicle based on the at least one image, said characteristic comprising at least one of a make, a model, and an accessory of the vehicle;

selecting an advertisement based on the determined characteristic; and outputting the selected advertisement from an advertisement unit proximate the fuel dispenser.

* * * * *